United States Patent [19]
Cannon et al.

[11] Patent Number: 4,721,060
[45] Date of Patent: Jan. 26, 1988

[54] NOSE-ONLY EXPOSURE SYSTEM

[75] Inventors: William C. Cannon, Richland; Edward W. Bass, Kennewick; John R. Decker, Jr., Pasco, all of Wash.

[73] Assignee: Battelle Memorial Institute, Columbus, Ohio

[21] Appl. No.: 887,572

[22] Filed: Jul. 17, 1986

[51] Int. Cl.$^4$ .................. A61D 7/04; A01K 1/03; A61B 5/08
[52] U.S. Cl. ...................... 119/15; 119/17; 128/204.18
[58] Field of Search ............ 119/15, 1, 52 R, 17, 119/18, 19; 128/203.12, 204.18, 204.25, 205.19, 205.26

[56] References Cited

U.S. PATENT DOCUMENTS

| | | | |
|---|---|---|---|
| 2,875,729 | 3/1959 | Gibson | 119/52 R |
| 3,548,840 | 12/1970 | Baumgartner | 119/17 |
| 4,479,493 | 10/1984 | Bung et al. | 119/15 X |
| 4,528,941 | 7/1985 | Spengler | 119/15 |

FOREIGN PATENT DOCUMENTS

| | | | |
|---|---|---|---|
| 121795 | 10/1984 | European Pat. Off. | 119/15 |
| 1014543 | 4/1983 | U.S.S.R. | 119/1 |

OTHER PUBLICATIONS

Cannon et al.: "The Flow-Past Chamber: An Improved Nose-Only Exposure System for Rodents"; American Industrial Hygiene Journal, vol. 44, pp. 923–928, Dec., 1983.
Battelle Centres de Recherche de Geneve: "The Battelle Nose-Only Flow Past Inhalation Toxicology Exposure System" (1985).

Primary Examiner—William F. Pate, III
Assistant Examiner—Richard E. Chilcot, Jr.
Attorney, Agent, or Firm—Joseph J. Hauth; Robert Keith Sharp

[57] ABSTRACT

An exposure system for supplying a gaseous material, i.e. an aerosol, gas or a vapor, directly to the noses of experimental animals includes concentric vertical inner and outer manifolds. The outer manifold connects with the necks of a large number of bottles in which the animals are confined with their noses adjacent the bottle necks. Readily detachable small tubes communicate with the inner manifold and extend to the necks of the bottles. The upper end of the outer manifold and the lower end of the inner manifold are closed. Gaseous material is supplied to the upper end of the inner manifold, flows through the small tubes to points adjacent the noses of the individual animals, then is drawn out through the bottom of the outer manifold. The bottles are readily removable and the device can be disassembled, e.g., for cleaning, by removing the bottles, removing the small tubes, and lifting the inner manifold from the outer manifold. The bottles are supported by engagement of their necks with the outer manifold supplemented, if additional support is required, by individual wire cradles. The outer ends of the bottles are closed by plugs, through which pass metal tubes which receive the tails of the animals (usually rodents) and which serve to dissipate body heat. The entire device is mounted for rotation on turntable bearings.

5 Claims, 4 Drawing Figures

NOSE-ONLY EXPOSURE SYSTEM

This invention relates to an exposure chamber for supplying gas, vapor or aerosol directly to the noses of a considerable number or experimental animals, ordinarily rodents such as rats. In the specification and claims, the term "gaseous material" is used to include gases, vapors and aerosols.

In many environmental and medical studies, it is necessary to conduct experiments involving the supply of gas or aerosol to experimental animals. Rodents such as rats, and also smaller animals, such as mice, are frequently used for this purpose. In many cases this is done through the use of relatively large chambers in which a number of animals are exposed to a common atmosphere. Such a system is shown in U.S. Pat. No. 4,216,741 to Owen R. Moss. This embodiment produces a highly uniform composition throughout the chamber.

In other cases, however, it is desired to confine the aerosol or gas to the noses alone of the animals. This may be done to reduce the amount of gaseous material required because of its expense or hazardous character, or because it is desired for experimental purposes to restrict the dose solely to the respiratory system of the animals. This is accomplished by so-called "nose-only exposure chambers". A highly desirable form of such a chamber is shown and described in an article by W. C. Cannon, E. F. Blanton, and K. E. McDonald of the Pacific Northwest Laboratories of Battelle Memorial Institute, American Industrial Hygiene Association Journal, Volume 44, pages 923–928 (Dec. 1983).

This article discloses a so-called "flow-past" system which is shown most clearly in FIG. 2 on page 925 of the above article. Aerosol is continually delivered thru a small tube to the nose of each animal and is exhausted therefrom without contacting the remainder of the animal or being circulated to other rodents. This has been found to produce a highly uniform dose to the lungs of the rats. A further development of this system is described in a bulletin issued by the Geneva, Switzerland Center of Research of Battelle Memorial Institute. This modification is described as being "modular, permitting easy cleaning and the choice of how many levels of animals will be used." It also shows circular tables or shelves surrounding the device for supporting the bottles in which the rodents are contained.

In these prior chambers (and also in the present device), the rodents are rather closely confined in bottles whose inner ends extend into fittings connected to a manifold and whose outer ends are closed by plugs, normally of rubber or similar material. In the prior chambers, as shown in the drawing on page 925 of the Cannon, et al., article, the tails of the rodents are doubled up within the bottles. This crowding of the tail is uncomfortable for the animals, particularly since a considerable proportion of their rejection of body heat is through the tail. This, of course, produces stress on the animals.

SUMMARY OF THE INVENTION

This invention involves an improvement over the prior "flow past" nose-only exposure systems described in the Cannon, et al., publication and the Battelle-Geneva Bulletin. It involves improvements which improve the visibility of the animals and their comfort, particularly in regard to the position of their tails and the heat rejection through the tails. It also includes improvements which render the system less expensive to manufacture.

The entire system is mounted for rotation on a commercially available turntable bearing, and the supply and exhaust conduits have swivel connections with the manifolds with which they communicate. These manifolds include an outer manifold connected at its bottom to the exhaust system and having a removable cover at its top. Within the outer manifold is an inner manifold of smaller diameter, leaving an annular passage between it and the outer manifold. At the top of the inner manifold is a connection to the supply system which furnishes gaseous material to the system.

Small tubes extend from the inner manifold to points adjacent to the noses of the experimental animals. These small tubes are made so as to be readily detachable from the inner manifold. Reducing connections are connected to the outer manifold by their smaller ends. The outer ends contain at least two O-rings which receive the smaller ends of the bottles in which the rodents are contained. This double O-ring connection provides a good seal and, in the case of smaller rodents, provides sufficient support for the bottles. For the larger bottles in which larger rodents are placed, there are provided individual cradle supports which clamp onto the reducing connections.

At the greater or outer ends of the bottles, there are metallic tubes or cylinders closed at their outer ends, formed of a metal having high thermal conduction which pass through closure plugs made of rubber or the like and receive the tails of the rodents. At the inner ends of these tubes are flanges. The tubes are slideable within the plugs and can be adjusted so that the flanges will hold the rodents in the desired positions. The metallic tubes allow the tails of the rodents to be in a more comfortable position, and the high thermal conduction of the tubes permits the rejection of heat to the ambient atmosphere. It has been found that there is as much as a 5° C. difference in body surface temperature between rats held in our new system and those confined in the previous type bottles without the metallic tail holder. At the same time, this produces a seal at the outer end of the bottle. When the gas or aerosol is hazardous, the chamber is usually operated under sub-atmospheric pressure. If a hole were simply provided for the tail, this would result in in-leakage of air, distorting the results of the experiment.

By reason of the structure defined above, the apparatus can be completely disassembled for cleaning, etc., by removing the bottles, removing the small tubes from the inner manifold, removing the cover from the outer manifold, and lifting out the inner manifold. Moreover, if it is desired to reduce the number of outlets for the gaseous material, the small tubes can be removed from the inner manifold and replaced by solid rods or plugs of the same size. By these expedients, the advantages of modular construction can be obtained without the expense involved in such a form of apparatus.

SHORT DESCRIPTION OF THE DRAWINGS

DETAILED DESCRIPTION

Figure 1:
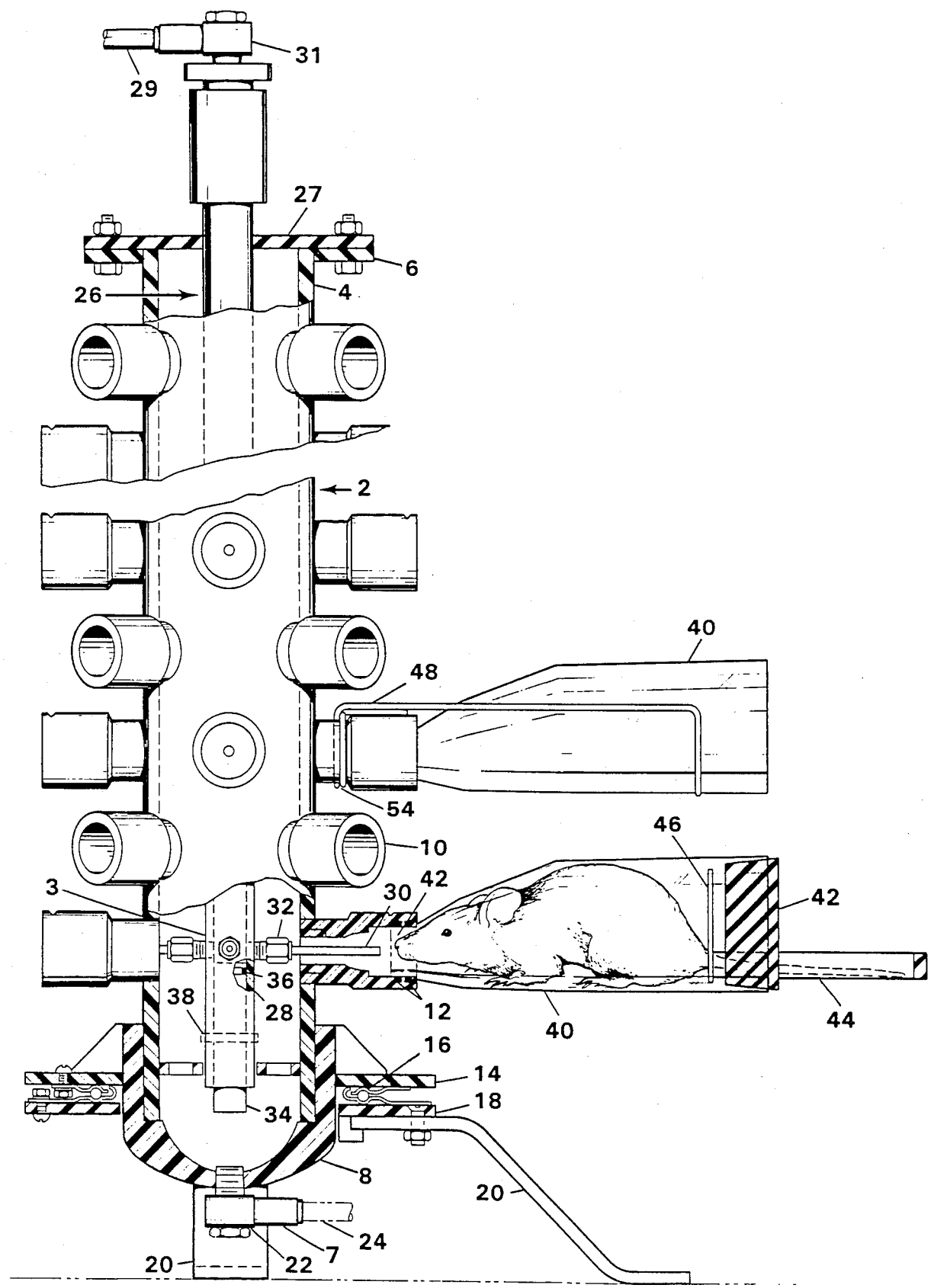
FIG. 1 is an assembly view, partly in elevation and partly in section, of our device.

Referring to the drawings, FIG. 1 shows a view partially in elevation and partially in section of our device. It includes an outer manifold 2, formed principally by a polyvinylchloride (PVC) pipe 4. At the upper end, there is cemented a PVC ring 6, and at the bottom a PVC cap 8. A large number (typically 48), reducing couplings 10, are cemented into the wall of pipe 4. The larger, outer ends of the couplings 10, are provided with at least two spaced O-rings 12 per coupling. A PVC ring 14 is cemented to cap 8 and is supported by turntable ballbearing 16 on ring shaped base 18, which in turn is secured to legs 20, of which there are typically four. Bearing 16 is a ball-type "Lazy Susan" bearing, manufactured by Triangle Manufacturing and commercially available. A swivel type coupling 22 connects the manifold to outlet line 24.

The top of outer manifold 2 is closed by a detachable cover 27 which is cemented to an inner manifold 26. This inner manifold is basically formed of a PVC pipe 28. An inlet line 29 is connected to pipe 28 by swivel connection 31. Small outlet tubes 30 for gaseous material are connected to the inner manifold by quick detachable couplings 32 and extend at their outer ends into each of the reducing couplings 10, terminating at points near where the noses of the rodents will be positioned. These tubes are typically made of copper, and the quick disconnects 32 are made of brass. The lower end of pipe 28 is closed by a plug 34, which is fitted with an O-ring 36 to act as a seal within pipe 28 and is held in place by a roll pin 38.

A bottle 40 to contain one of the experimental animals is provided with a neck 42 which fits within the outer end of each connection 10 and is sealed and supported by O-rings 12. The outer end of each bottle 40 is closed by a stopper 42 made of rubber or similar material. Cylinder 44 passes through the stopper 42 at a height which is convenient for the reception of the tail of the rodent which is to be confined. At the end of each cylinder 44 is a flange 46. The cylinder 44 is so proportioned that it forms a seal with stopper 42, but can be slid within it so as to position flange 46. The latter is made so as to contact the rump of the rodent and hold it in the proper position relative to the tube 30. Cylinder 44 has high heat conduction, being made of copper, aluminum, or other metal having high heat conductivity, or being sufficiently thin.

Figure 3:
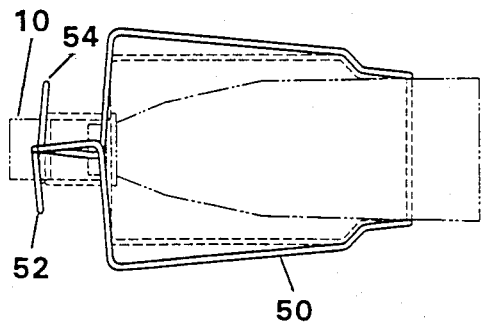
FIG. 3 is a top view of a cradle for supporting the bottles shown in FIG. 1.
Figure 4:
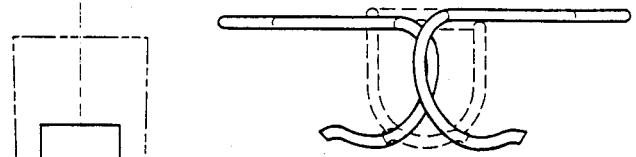
FIG. 4 is an end view of the cradle shown in FIG. 3.
Figure 2:
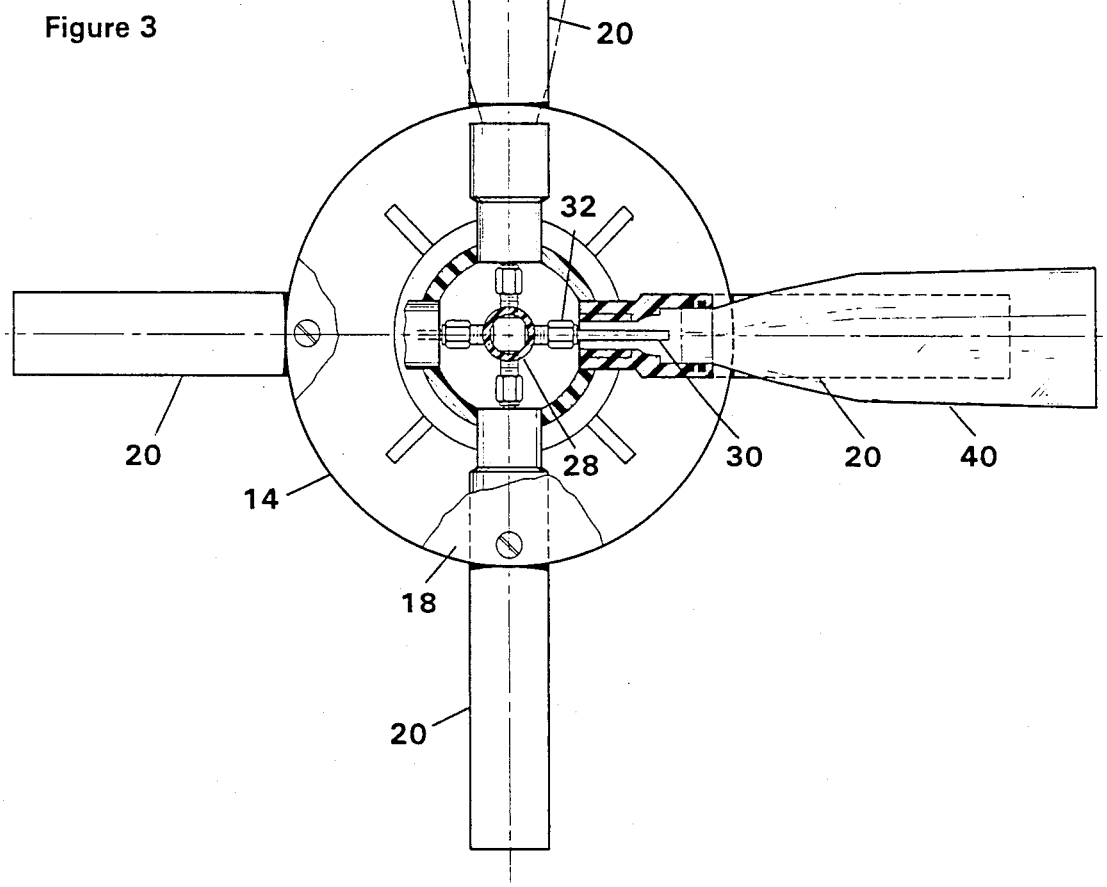
FIG. 2 is a top view partially in section of the device shown in FIG. 1.

While the engagement of neck 42 of the bottles with the O-rings 12 is sufficient to support small bottles adapted to receive small rodents, larger bottles require additional support. For this purpose, we provide cradles 48. As shown in FIGS. 3 and 4, these are made of wire, preferably of 302 stainless steel music wire, which is a spring material. The cradle includes a body portion 50, which terminates in overlapping hooks 52, 54, which cooperate to clamp the cradle on the smaller portion of the coupling 10. When it is desired to attach the cradle, the body portion is squeezed, parting the hooks so that they can be slid over the coupling 10. When released, they will clamp as shown in FIG. 1. These individual cradles for the bottles give improved visibility of the rodents as compared to the shelves of the Battelle-Geneva system while still providing adequate support.

Certain details of the structure will now be described:

The form of quick-disconnect 32 which we have used is one manufactured by, and commercially available from, Legris, Inc. It is described and claimed in U.S. Pat. No. 3,653,689, granted April 4, 1972 to Jaques Sapy and Andre Legris.

Since there is little, if any, force tending to eject the tubes 30, other types of connections may be used, e.g. O-rings. However, it is often cheaper to utilize commercial fittings than to specially machine connectors such as those utilizing O-rings. The only essential requirement is that the tubes be readily detachable from the pipe 28.

The swivel type connections 22 and 31 have essentially the same construction as the quick disconnects 32. Again, the specific structure is not critical.

When it is desired to disassemble the device, e.g. for cleaning, the bottles 40 can be removed, tubes 30 taken out, inlet line 29 and outlet line 24 disconnected, cover 24 detached from ring 6, and inner manifold 26 lifted out. If it is desired to treat less than the maximum number of rodents, the unnecessary tubes 30 can be removed and replaced by solid rods or plugs of the same size. The advantages of modular construction are thus attained without its expense.

While we have described one embodiment of our invention in detail, it will be understood that various changes can be made. For example, stainless steel may replace PVC as the material of construction. We therefore wish our invention to be limited solely by the scope of the appended claims.

The embodiments of the invention in which a proprietary right or privilege is claimed are defined as follows:

1. An exposure system for delivering gaseous material to the noses of a considerable number of experimental animals, comprising;
   (a) a vertical outer cylindrical manifold having a removable cover on its upper end and a substantially closed lower end;
   (b) a turntable supporting said outer manifold at its lower end;
   (c) a plurality of reducing couplings mounted at different levels on said outer manifold with their smaller ends extending through the walls of said manifold and their larger ends extending outwardly therefrom;
   (d) at least two spaced apart O-rings within the larger ends of each of said reducing couplings;
   (e) a plurality of bottles, each of said bottles having a body portion of sufficient size to receive the body of a rodent and a reduced end portion of sufficient size to receive the head of said rodent and terminating in a neck fitting snugly within said O-rings, said bottles being supported by said O-rings;
   (f) an inner manifold within said outer manifold and spaced therefrom, leaving an annular passageway;
   (g) a closure for the lower end of said inner manifold;
   (h) a plurality of tubes, each having an open inner end in communication with, but readily detachable from, said inner manifold, and an open outer end adjacent to said neck of one of said bottles;
   (i) said inner manifold having an inlet for gaseous material at its upper end and said outer manifold having an outlet at its lower end;
   (j) whereby gaseous material will flow through each of said tubes to the nose of each rodent and out through said passageway, and whereby said device can be disassembled by removing said bottles, disconnecting said tubes from said inner manifold, removing the cover of said outer manifold and withdrawing said inner manifold.

2. An exposure system as defined in claim 1 and further comprising individual supports for said bottles, each of said supports being clamped to, and solely supported by, one of said couplings.

3. An exposure system as defined in claim 1 and further comprising a metal cylinder of such a size and position as to receive a tail of a rodent extending from the outer end of each bottle; said cylinder being closed at its outer end.

4. An exposure system as defined in claim 3 and further comprising a flange on the inner end of said cylinder, said cylinder and flange being adjustable to position the rodent in the bottle.

5. An exposure system as defined in claim 1 and further comprising an elastomeric plug closing the end of each of said bottles, a cylinder of such size and position as to receive a tail of a rodent extending through each of at least some of said plugs and closed at its outer end, a flange on the inner end of each cylinder, each cylinder being longitudinally adjustable in the corresponding plug, whereby the corresponding flange may position a rodent, said cylinder and flange being made of metal having high heat conduction to thereby dissipate body heat of said rodent.

* * * * *